May 10, 1960
W. CHRISTENSEN
2,935,867
MOISTURE DETECTOR
Filed May 31, 1957
4 Sheets-Sheet 1
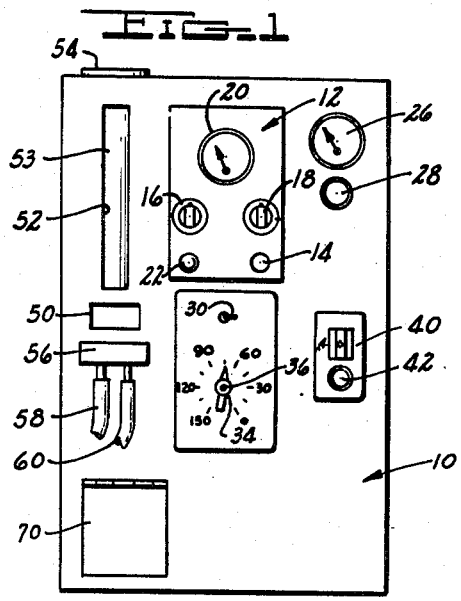
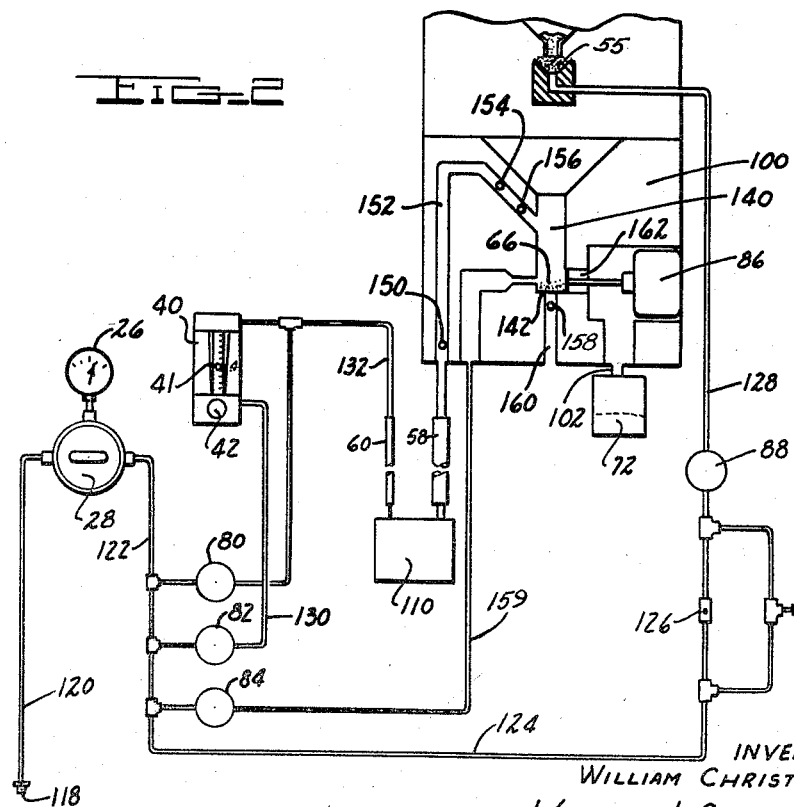
INVENTOR
WILLIAM CHRISTENSEN
KOTTS & SHERIDAN
ATTORNEYS

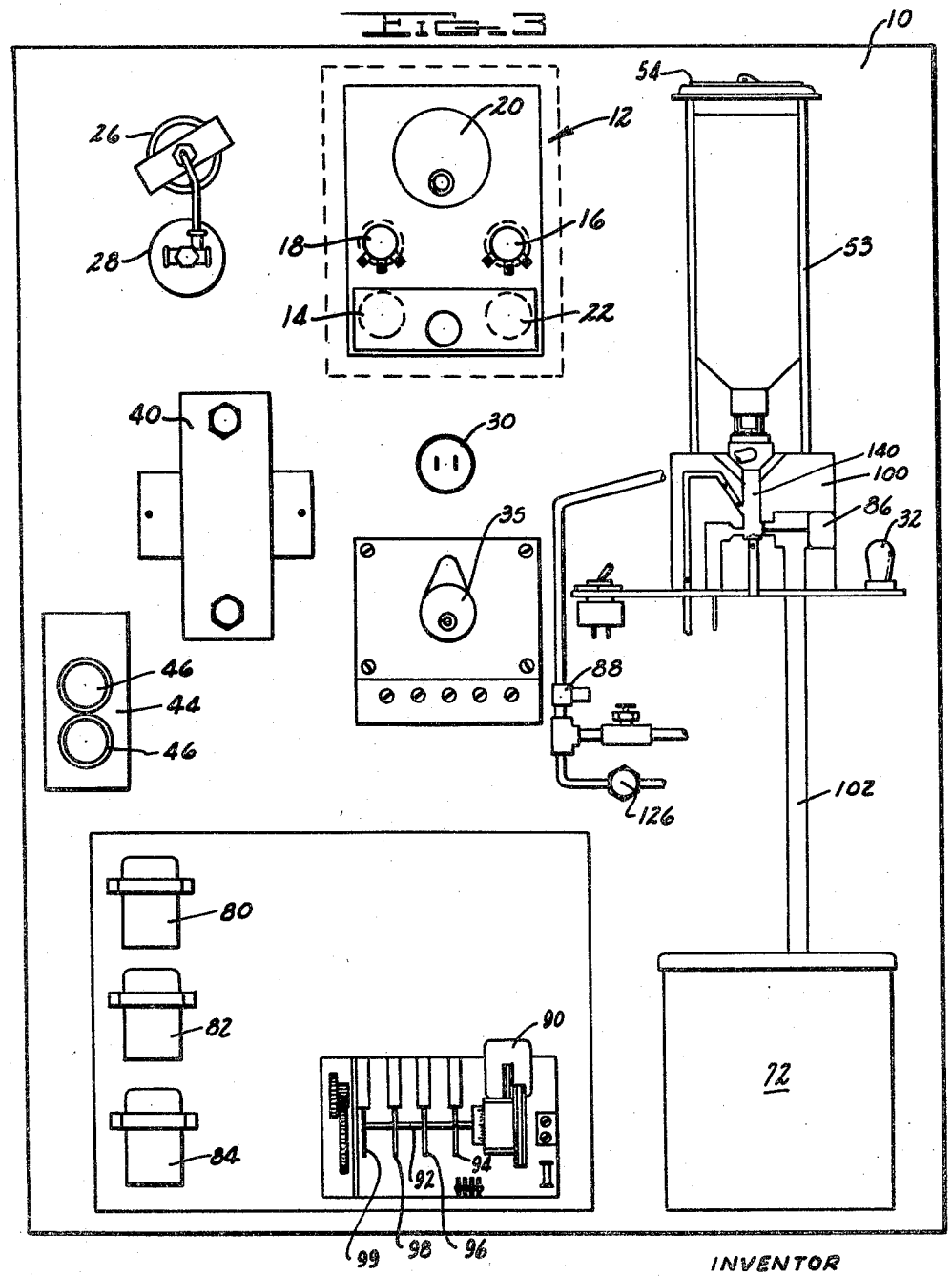

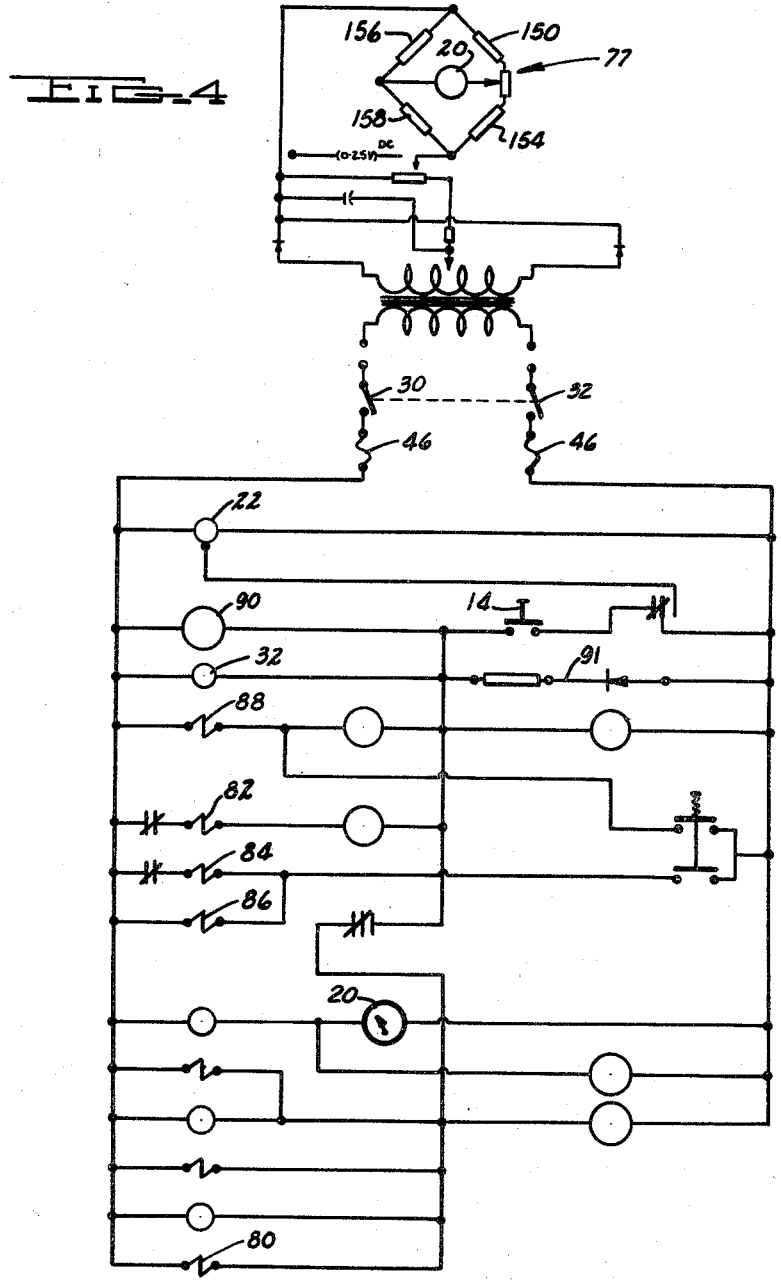

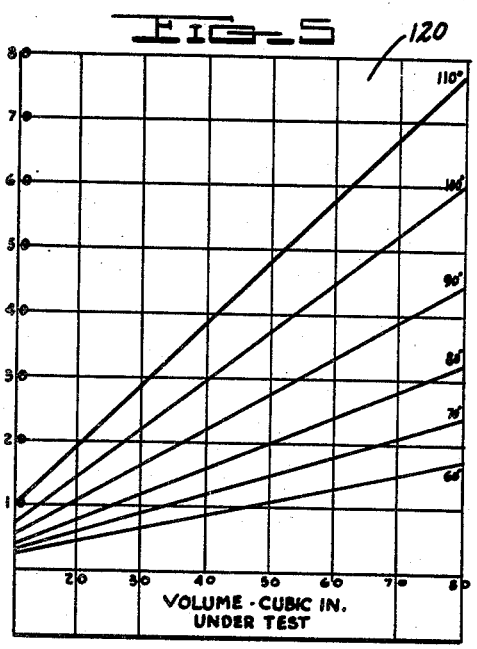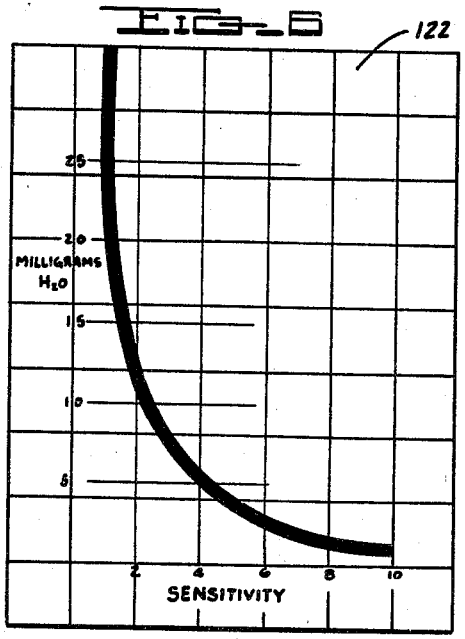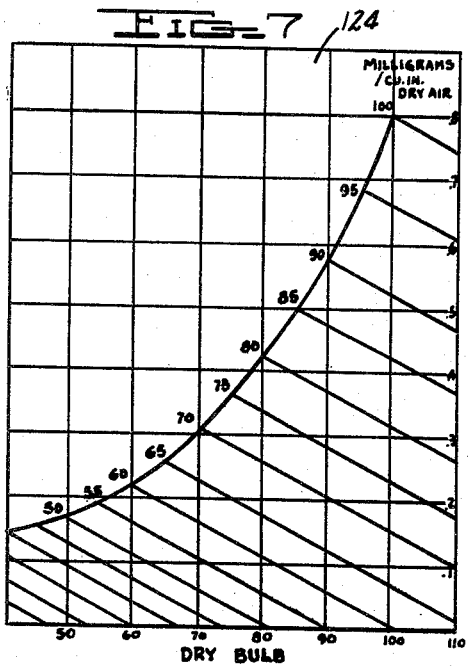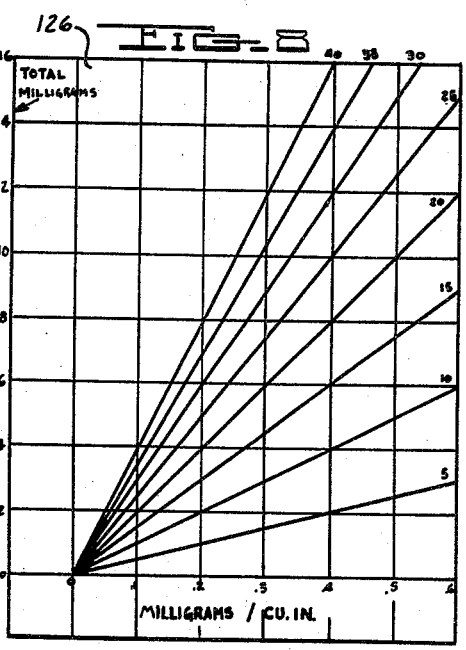

United States Patent Office 2,935,867
Patented May 10, 1960

2,935,867

MOISTURE DETECTOR

William Christensen, Detroit, Mich.

Application May 31, 1957, Serial No. 662,721

5 Claims. (Cl. 73—29)

The present invention relates to new and useful improvements in moisture detection and more particularly to an apparatus for automatically detecting varying quantities of moisture in measured volumes of air.

Moisture contamination of refrigeration components may be caused by a variety of reasons. It can be caused by a small amount of liquid entering the system from the water wash used in the anodizing process. Contamination can also be caused after a silver soldering operation has been completed by water which is used to rinse away the excess flux. When a leak test of a component is made in a submersion tank, a small amount of moisture sometimes enters the system causing contamination. Whatever the cause of contamination, it is necessary to carefully check and thoroughly inspect each part intended for use in a refrigeration system to prevent the usage of moisture contaminated parts.

For many years there has been a need for a dependable and accurate method of determining within limits the moisture content present in production refrigeration components. Although in the past various laboratory methods and procedures have been used to measure varying quantities of moisture for quality control purposes, they have not proven very successful when used for mass production testing.

It is a further object of the present invention to provide a compact practical moisture detecting unit, which is simple and economical to operate, and which will permit one hundred percent inspection of production parts.

Still another object of the present invention in addition to those previously mentioned is the provision of a moisture detector which is adjustable and which will operate within a preselected range.

The foregoing objects can be accomplished by the provision of a moisture detector having a test block with a gas passage therethrough, through which a test gas sample must pass; a support member in the test block gas passage for retaining a hygroscopic substance in said test gas passage; means for measuring and interposing the hygroscopic substance into said gas passage; control means for limiting the test gas velocity; means for measuring entrance and exhaust temperature differential of said test gases; indicating means for manually rejecting a test sample containing an amount of moisture in excess of a predetermined value; and means for removing used hygroscopic substance from said gas passage after each successive test.

Other objects of this invention will appear in the following description and appended claims, reference being had to the accompanying drawings forming a part of this specification wherein like reference characters designate corresponding parts in the several views.

In the drawings:

Fig. 1 is an elevational view of a control panel of a moisture detector embodying the present invention.

Fig. 2 is a diagrammatic view of the present invention.

Fig. 3 is an enlarged view of the reverse side of Fig. 1.

Fig. 4 is a schematic diagram of the electrical circuit in the present invention.

Fig. 5 is a chart illustrating the permissible amount of moisture for a given temperature.

Fig. 6 is a chart used in connection with adjustment of the sensitivity control of the present invention.

Fig. 7 is a chart used in the calibration of the present invention.

Fig. 8 is a second chart used in the calibration of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, Fig. 1 illustrates the cabinet control panel 10 of a moisture detector embodying the present invention. A sensitivity board 12 is mounted on the upper central portion of the cabinet control panel 10. The sensitivity board 12 has mounted thereon a manual start switch 14, and a rotatable sensitivity adjustment knob 16. A meter relay 20 is provided and has an adjustment knob 18 with which to balance the thermistor bridge circuit. A reject lamp 22 is mounted below the sensitivity adjustment knob 16 and to the left of start switch 14.

Immediately below the sensitivity board 12 on panel 10 is mounted a power switch 30 and an adjustable recovery cycle switch 34. To the right of the power switch 30 and recovery cycle switch 34 is located an adjustable flow meter 40. The adjustment of the flow meter is controllable through the rotation of control knob 42. To the left of the power switch 30 is located an observation window 50. Through this window, the amount of desiccant in the gas passage can be viewed. Below the observation window 50 is located a manifold structure 56, to which is connected a large diameter plastic tube 58 and a small diameter plastic tube 60. Below the manifold structure 56 is a hinged door member 70, which is used to remove the used desiccant from within the cabinet housing 10. Above the observation window 50 is a second window opening 52 which permits viewing the quantity of desiccant in the hopper within the desiccant container 53. A desiccant cover member 54 is provided on the transparent desiccant container 53 to prevent any moisture contamination from the atmosphere. To the right of the sensitivity board 12 is located a pressure indicating gauge 26 and a rotatable pressure regulator valve 28.

Referring to Fig. 3 of the drawings, the back of the control panel housing is illustrated. From this illustration it will be noted that several parts which are not visible in the front view are shown. To the left of the used desiccant tray 72 is located a timing motor 90 which has a horizontal cam shaft 92 and four control cams mounted thereon. The cam 94 mounted on shaft 92 is the start and stop cycle cam, and cam 96 is the desiccant charge cam. Cam 98 on shaft 92 is the test air cam while cam 99 is the desiccant clean-out cam. A fuse block 44 is provided with two suitable fuses 46. Below the fuse block 44 are located three solenoid control valves 80, 82 and 84 which are operated by cams 96, 98 and 99 mounted on shaft 92 as shown in Fig. 3. Cam 96 and solenoid 88 actuate the charge valve; cam 98 and solenoid 82 actuate the test valve; and cam 99 and solenoid 84 actuate the cleanout valve and solenoid 86 to remove the used desiccant from the test block 100 after each successive test. A hollow tube member 102 is provided beneath the test block 100 to convey the used desiccant into a tray 72, located under the lower end of the tube.

Fig. 2 of the drawings illustrates the gas flow circuit used in the present invention. The test sample 110 is shown in diagrammatic block form, since it may be any of several components, for example, an evaporator tube assembly, condenser, receiver, etc. or any unit in which moisture determination and control is a critical problem.

The unit functions in the following manner:

The moisture detector is activated by a power switch 30, which in turn energizes the "power-on" lamp 32. The lamp 32 when energized illuminates the observation window 50 in the cabinet control panel 10, indicating the moisture detector is ready for operation.

Before any production testing is started, it is first necessary to test check the system for existing moisture and adjust the selectivity controls for the proper range of operation using charts 120 and 122 shown in Figs. 5 and 6 of the drawings. From chart 120 is determined the quantity of moisture which may be present in a given volume of air at a given temperature, while chart 122 when used in combination with chart 120, guides the range adjustment of sensitivity control 16.

To test check the machine before using, it is first necessary to join the large diameter plastic tube 58 and the small diameter tube 60 together. A source of dry air or nitrogen having a dew point of —40 is connected to the system with coupling 118. The dry gas passes through tube 120 and into the pressure regulator valve 28. The gas pressure is adjusted on the pressure gauge 26 to read 25 pounds per square inch. After waiting 2 or 3 minutes, start button 14 is depressed, which energizes timing motor 90 and rotates the timing motor cam shaft 92. During the initial portion of the rotation of cam 96 on cam shaft 92, the charge solenoid 88 is energized and a puff of gas, regulated by needle valve 126, blows a predetermined amount of desiccant out of the desiccant hopper cup 55 into the gas passage 140 of the test block 100 the amount of material (desiccant) used is determined by the distance the mouth of the hopper feed extends above the hopper cup 55 (Fig. 2), since the desiccant is gravity fed and the feed opening is blocked when the hopper cup is filled. This thereby limits the amount of desiccant deposited in the cup. The desiccant is retained in the test block with a screen member 142 mounted in the gas passage 140. The desiccant material used is an indicating calcium sulphate having a 10–20 mesh grain size and in the presence of water is accompanied by a temperature rise, which is proportional to the quantity of water present. The temperature differential caused by the introduction of moisture is measured by a thermistor bridge circuit. Although the desiccant used may be reactivated, a reduction of grain size results, therefore reactivation is not recommended.

Immediately after the charge solenoid 88 has been momentarily energized and the desiccant deposited in the gas passage, test gas begins to flow through solenoid valve 82 which has been activated by the rotation of cam 98. Test gas then flows through test valve 82 and tube 130 into the flow meter 40 which is regulated by the control knob 42. A ball member 41 is centered in the flow meter tube opposite the .4 mark, indicating the exact volume of gas passing therethrough. The gas continues from the flow meter 40 through passage 132 and into the small diameter plastic tube 60 and out through the large diameter plastic tube 58. The gas continues through the test block 100 and over the thermistor units via passage 152, through gas passage 140 and through the desiccant 66 which is retained in the passage by screen member 142. The gas then passes over a second thermistor unit which indicates any temperature differential caused by moisture in the system. The gas is then exhausted into the atmosphere via passage 160. Also during this time the sensitivity control knob 16 is adjusted. This is accomplished by turning the control knob 16 clockwise to the limit of rotation. The meter relay 20 in the thermistor bridge circuit is then balanced by rotation of the balance adjustment knob 18. The thermistor bridge is in balance when the thermistors in the circuit are at the same temperature. Since the reject lamp 22 did not become energized, the system is now ready for test. Before any tests are run however, the instrument and parts to be checked should be at the ambient temperature for approximately three hours.

To operate the moisture detector, plastic tubes 58 and 60 are disconnected and then connected to a test sample 110. The start button 14 is depressed and a reverse current brake 91 in series with the timing motor 90 is released, causing the "power-on" lamp 32 to brighten up. This is an indication that a unit is under test. Rotation of cam shaft 92 driven by timing motor 90 first energizes the charge solenoid and a puff of air charges the test block gas passage 140 with desiccant. Following this charging action, cam 98 energizes the test air valve 82 permitting gas flow through passage 130 into the flow meter 40 and out passage 132, through the test sample 110 via the small diameter plastic tube 60 and exhausting through the large diameter plastic tube 58 into the test block 100. The entrance temperature of the test gas is measured by thermistor units 150 and 154 located in the entrance passage 152. A second entrance temperature is measured in passage 152 by thermistor unit 156. As the test gas is passed through the hygroscopic material 66 and over the thermistor unit 158, any moisture present will be indicated by the temperature differential measured by thermistor 158 in the exhaust passage 160. The dump solenoid 86 and cleanout solenoid 84 are energized by cam 99 and open to permit gas passage through tube 159 and into the test block 100, blowing the used desiccant 66 through opening 162 and into the used desiccant chamber 72 through hollow tube 102. The moisture detector, after a complete cycle, automatically stops and is ready for a successive cycle.

Should the next sample have an excessive amount of moisture present in the circuit, the temperature differential indicated by the thermistor bridge circuit 77 will energize the reject light 22 stopping the flow of gas through the test valve 82, and will dump the moisture laden gas in the system to atmosphere through passage 160.

After the reject has occurred, a recovery cycle must take place before any additional tests can be made. The system must be dried out in the following manner, which is similar to the initial moisture detection test that was made before the machine was put into operation. The test sample 100 is disconnected from the circuit and plastic tubes 58 and 60 are joined together. The center button 36 in the recovery cycle switch 34 is depressed and a second timing motor 35 is energized and opens valve 80 to clear the system. Valve 80 when opened for a predetermined time, ranging from 15 to 20 seconds, exhausts all of the gas in the system, thus flushing and drying out the entire test block. The controls which were previously adjusted, require no additional adjustment after the recovery cycle has taken place. If there is any question as to the dryness of the instrument, the plastic tubes are allowed to remain joined and a test cycle is run. Movement of the meter relay needle will indicate any moisture still present in the circuit. The meter relay 20 contains a pair of adjustable contact points which are actuated in accordance with the setting of control knob 18. The meter relay needle is mounted on a dial member and actuated when the relay is energized and the adjustable contacts closed.

To calibrate the instrument described, it is necessary to inject a known volume of atmospheric air into a dry accumulator and then test the accumulator. If the wet and dry bulb temperatures are known, we can take a reading from the psychrometic chart 124 illustrated in Fig. 7, and then using chart 126 illustrated in Fig. 8, we can determine the moisture content in a given volume of air. The operator then injects into the system this known quantity of moisture and adjusts the moisture detector to indicate a reject at the end of the test gas cycle.

Having thus described my invention, I claim:

1. In a production type moisture detector, the combination of a test block having entrance and exhaust gas passages therethrough; a gravity feed desiccant container in spaced relationship to a cup member mounted above said test block and below said desiccant container; a gas supply in communication with said cup member; control means for limiting gas supply to said cup; means for retaining a hygroscopic substance in said gas passage; means for limiting said test gas pressure; a thermistor bridge in said passage for sensing said test gas entrance and exhaust temperature; the entrance and exhaust gas temperature differential operating means for visually detecting a test sample containing moisture in excess of a predetermined amount; and means for removing said hygroscopic substance after each successive test.

2. In a production type moisture detector, the combination of a test block having entrance and exhaust gas passages therethrough; a screen support member mounted in said test block; a gravity feed desiccant container; a measuring cup mounted below said desiccant container; a gas supply in communication with said cup; means for controlling said gas supply to said cup; entrance and exhaust gas temperature sensing means in said passage; said sensing means operating a means for detecting a test sample containing moisture in excess of a predetermined amount; a hygroscopic substance in said desiccant container; and means for removing said hygroscopic substance interposed in said test gas passage after each successive test.

3. In a production type moisture detector, the combination of a test block having entrance and exhaust gas passages therethrough; a gravity feed desiccant container containing a hygroscopic substance; a measuring cup mounted in spaced relationship below said desiccant container and above said test block; a gas supply in communication with said measuring cup; cam actuated means for controlling said gas supply, which when momentarily opened will cause a puff of gas to spill the hygroscopic substance from said measuring cup, so as to interpose said hygroscopic substance into said test gas passage; a thermistor bridge for sensing entrance and exhaust gas temperature in said gas passage; a temperature differential operating means for detecting a test sample containing an excessive amount of moisture; and cam actuated electric solenoid control means for removing said hygroscopic substance after each successive test.

4. In a production type moisture detector, the combination of a test block having entrance and exhaust gas passages therethrough; a screen support member in said gas passage; a gravity feed desiccant container having a cover member; a hygroscopic substance in said desiccant container; means for measuring and interposing said hygroscopic substance into said test gas passage; a thermistor bridge circuit for sensing said test gas entrance and exhaust temperature in said passage; any temperature differential is caused by moisture retention in said hygroscopic substance as said test gas is passed through; control means for controlling the cycle of said moisture detector.

5. In a production type moisture detector, the combination of a test block having entrance and exhaust gas passages therethrough; a screen support member in said test gas passage; a gravity feed desiccant container, having a cover member; a hygroscopic substance in said desiccant container; cam actuated electric solenoid gas control means for interposing said hygroscopic substance into said test gas passage; a thermistor bridge circuit for sensing said test gas entrance and exhaust temperature in said passage; any temperature differential caused by moisture retention in said hygroscopic substance actuator a visual reject lamp; a cam shaft driven by a timing motor to control the cycle of said moisture detector; control means on timing motor to rotate and stop said motor in a predetermined position; an indicating lamp in said control circuit, which is dim when circuit is not energized and bright when circuit is energized; means for indicating a reject when said test gas sample contains moisture in excess of a predetermined amount; and cam actuated electric solenoid gas control means for removing used desiccant from said gas passage after each test.

References Cited in the file of this patent

UNITED STATES PATENTS

| | | |
|---|---|---|
| 2,181,756 | Cook | Nov. 28, 1939 |
| 2,654,242 | Fallgatter et al. | Oct. 6, 1953 |
| 2,732,710 | Richardson | Jan. 31, 1956 |

UNITED STATES PATENT OFFICE
CERTIFICATE OF CORRECTION

Patent No. 2,935,867                                  May 10, 1960

William Christensen

It is hereby certified that error appears in the printed specification of the above numbered patent requiring correction and that the said Letters Patent should read as corrected below.

Column 6, line 30, for "actuator" read -- actuates --.

Signed and sealed this 4th day of October 1960.

(SEAL)
Attest:

KARL H. AXLINE                                    ROBERT C. WATSON
Attesting Officer                                   Commissioner of Patents